US009906592B1

(12) United States Patent
Roitshtein et al.

(10) Patent No.: US 9,906,592 B1
(45) Date of Patent: Feb. 27, 2018

(54) RESILIENT HASH COMPUTATION FOR LOAD BALANCING IN NETWORK SWITCHES

(71) Applicant: Marvell Israel (M.I.S.L) Ltd., Yokneam (IL)

(72) Inventors: Amir Roitshtein, Holon (IL); Gil Levy, Hod Hasharon (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 389 days.

(21) Appl. No.: 14/657,898

(22) Filed: Mar. 13, 2015

Related U.S. Application Data

(60) Provisional application No. 61/952,783, filed on Mar. 13, 2014.

(51) Int. Cl.
G06F 15/173 (2006.01)
H04L 29/08 (2006.01)
H04L 12/709 (2013.01)

(52) U.S. Cl.
CPC ........ H04L 67/1036 (2013.01); H04L 45/245 (2013.01)

(58) Field of Classification Search
CPC ............. H04L 67/1023; H04L 67/1036; H04L 45/7423; H04L 45/245
See application file for complete search history.

(56) References Cited

U.S. PATENT DOCUMENTS

| 5,032,987 | A | 7/1991 | Broder et al. |
| 6,035,107 | A | 3/2000 | Kuehlmann et al. |
| 6,249,521 | B1 | 6/2001 | Kerstein |
| 6,363,396 | B1 | 3/2002 | Klots et al. |
| 6,430,170 | B1 | 8/2002 | Saints et al. |
| 6,614,758 | B2 | 9/2003 | Wong et al. |
| 6,735,670 | B1 | 5/2004 | Bronstein et al. |
| 6,757,742 | B1 | 6/2004 | Viswanath |
| 6,973,082 | B2 | 12/2005 | Devi et al. |

(Continued)

FOREIGN PATENT DOCUMENTS

WO  WO 2013017017 A1 *  2/2013 ......... H04L 45/7453

OTHER PUBLICATIONS

Mizrahi et al., U.S. Appl. No. 12/537,078, filed Aug. 6, 2009.

(Continued)

*Primary Examiner* — Jonathan Bui

(57) ABSTRACT

A network device includes a packet processor device that determines that packets are to be transmitted via a group of network interfaces, and a load balancing network interface selector. The load balancing network interface selector selects network interfaces in the group via which to egress packets from the network device using a first hash function. In response to determining that a first network interface within the group has become inoperable, the load balancing network interface selector continues to use the first hash function to select network interfaces in the group via which to egress packets from the network device. In response to determining that the first network interface within the group has become inoperable and when the first network interface is selected for packets using the first hash function, the load balancing load balancing network interface selector reselects network interfaces in the group using a second hash function.

9 Claims, 9 Drawing Sheets

(56) References Cited

U.S. PATENT DOCUMENTS

| | | | |
|---|---|---|---|
| 7,190,696 B1 | 3/2007 | Manur et al. | |
| 7,224,845 B1 | 5/2007 | Russo et al. | |
| 7,280,527 B2 | 10/2007 | Basso et al. | |
| 7,346,706 B2 | 3/2008 | Rezaaifar et al. | |
| 7,424,016 B2 | 9/2008 | Sweeney et al. | |
| 7,539,750 B1 | 5/2009 | Parker et al. | |
| 7,554,914 B1 | 6/2009 | Li et al. | |
| 7,567,567 B2 | 7/2009 | Muller et al. | |
| 7,580,417 B2 | 8/2009 | Ervin et al. | |
| 7,613,209 B1 | 11/2009 | Nguyen et al. | |
| 7,623,455 B2 | 11/2009 | Hilla et al. | |
| 7,639,614 B2 | 12/2009 | Nakagawa et al. | |
| 7,796,594 B2 | 9/2010 | Melman et al. | |
| 7,821,925 B2 | 10/2010 | Davies | |
| 7,821,931 B2 | 10/2010 | Swenson et al. | |
| 7,898,959 B1 | 3/2011 | Arad | |
| 7,969,880 B2 | 6/2011 | Yano et al. | |
| 7,979,671 B2 | 7/2011 | Aviles | |
| 8,004,990 B1 | 8/2011 | Callon | |
| 8,175,107 B1* | 5/2012 | Yalagandula | H04L 45/66 370/408 |
| 8,238,250 B2 | 8/2012 | Fung | |
| 8,243,594 B1 | 8/2012 | Fotedar et al. | |
| 8,244,909 B1 | 8/2012 | Hanson et al. | |
| 8,259,585 B1* | 9/2012 | S P | H04L 45/125 370/237 |
| 8,274,971 B2 | 9/2012 | Battle et al. | |
| 8,339,951 B2 | 12/2012 | Scaglione | |
| 8,355,328 B2 | 1/2013 | Matthews et al. | |
| 8,364,711 B2 | 1/2013 | Wilkins et al. | |
| 8,503,456 B2 | 8/2013 | Matthews et al. | |
| 8,587,674 B2 | 11/2013 | Iwata | |
| 8,614,950 B2 | 12/2013 | Roitshtein et al. | |
| 8,625,594 B2 | 1/2014 | Safrai et al. | |
| 8,660,005 B2 | 2/2014 | Roitshtein et al. | |
| 8,756,424 B2 | 6/2014 | Roitshtein et al. | |
| 8,792,497 B2 | 7/2014 | Rajagopalan et al. | |
| 8,848,728 B1 | 9/2014 | Revah et al. | |
| 2002/0093952 A1 | 7/2002 | Gonda | |
| 2003/0043825 A1 | 3/2003 | Magnussen et al. | |
| 2003/0147385 A1 | 8/2003 | Montalvo et al. | |
| 2003/0210688 A1 | 11/2003 | Basso et al. | |
| 2003/0235168 A1 | 12/2003 | Sharma et al. | |
| 2004/0073640 A1 | 4/2004 | Martin et al. | |
| 2005/0198297 A1* | 9/2005 | Tzeng | H04L 12/4625 709/226 |
| 2005/0213582 A1 | 9/2005 | Wakumoto et al. | |
| 2006/0251109 A1 | 11/2006 | Muller et al. | |
| 2007/0280258 A1 | 12/2007 | Rajagopalan et al. | |
| 2008/0031263 A1 | 2/2008 | Ervin et al. | |
| 2008/0037544 A1 | 2/2008 | Yano et al. | |
| 2008/0049774 A1 | 2/2008 | Swenson et al. | |
| 2008/0052488 A1 | 2/2008 | Fritz et al. | |
| 2008/0069114 A1* | 3/2008 | Shimada | H04L 29/12028 370/395.31 |
| 2008/0084881 A1 | 4/2008 | Dharwadkar et al. | |
| 2008/0181103 A1 | 7/2008 | Davies | |
| 2008/0205655 A1 | 8/2008 | Wilkins et al. | |
| 2009/0196303 A1 | 8/2009 | Battle et al. | |
| 2009/0274154 A1 | 11/2009 | Kopelman et al. | |
| 2010/0023726 A1 | 1/2010 | Aviles | |
| 2010/0142410 A1 | 6/2010 | Huynh Van et al. | |
| 2010/0214913 A1 | 8/2010 | Kompella | |
| 2010/0284404 A1* | 11/2010 | Gopinath | G06F 9/5005 370/392 |
| 2011/0013627 A1 | 1/2011 | Matthews et al. | |
| 2011/0013638 A1 | 1/2011 | Matthews et al. | |
| 2011/0013639 A1 | 1/2011 | Matthews et al. | |
| 2011/0102612 A1 | 5/2011 | Iwata | |
| 2011/0134925 A1 | 6/2011 | Safrai et al. | |
| 2011/0295894 A1 | 12/2011 | Yoo | |
| 2011/0296411 A1 | 12/2011 | Tang et al. | |
| 2012/0136846 A1 | 5/2012 | Song et al. | |
| 2013/0013880 A1 | 1/2013 | Tashiro et al. | |
| 2014/0093073 A1 | 4/2014 | Horgan et al. | |
| 2014/0115167 A1* | 4/2014 | Roitshtein | H04L 47/125 709/226 |
| 2014/0160934 A1 | 6/2014 | Roitshtein et al. | |
| 2014/0173129 A1* | 6/2014 | Basso | H04L 12/5689 709/238 |
| 2014/0301394 A1 | 10/2014 | Arad et al. | |
| 2014/0325228 A1 | 10/2014 | Roitshtein et al. | |
| 2015/0334057 A1* | 11/2015 | Gao | H04L 49/351 370/392 |

OTHER PUBLICATIONS

Thaler et al., "Multipath Issues in Unicast and Multicast Next-Hop Selection," The Internet Society, 2000, 10 pages.

Raoof, K., Prayongpun, N., Impact of Depolarization Effects on MIMO Polarized Wireless Configuration, Wireless Communications, Networking and Mobile Computing, 2007. WiCom 2007, Sep. 21-25, 2007, pp. 1-4.

IEEE Std 802.1Q, 2003 Edition, "IEEE Standards for Local and Metropolitan area networks—Virtual Bridged Local Area Networks," *The Institute of Electrical and Electronics Engineers, Inc.*, 327 pages (May 7, 2003).

IEEE Std 802.1Q-2011 (Revision of IEEE Std.802.1Q-2005), "IEEE Standard for Local and Metropolitan Area Networks—Media Access Control (MAC) Bridges and Virtual Bridged Local Area Networks," *The Institute of Electrical and Electronics Engineers, Inc.*, 1,365 pages (Aug. 31, 2011).

IEEE P802.1aq/D4.6, Draft Amendment to IEEE Std 802.1Q-2011, "IEEE Draft Standard for Local and Metropolitan Area Networks—Media Access Control (MAC) Bridges and Virtual Bridged Local Area Networks—Amendment XX: Shortest Path Bridging," *The Institute of Electrical and Electronics Engineers, Inc.*, 363 pages (Feb. 10, 2012).

IEEE P802.1ad/D6.0, Draft Amendment to IEEE Std 802.1Q, "IEEE Draft Standard for Local and Metropolitan Area Networks—Virtual Bridged Local Area Networks—Amendment 4: Provider Bridges," *The Institute of Electrical and Electronics Engineers, Inc.*, 60 pages, (Aug. 17, 2005).

Demetriades et al., "An Efficient Hardware-based Multi-hash Scheme for High Speed IP Lookup," 2008 16th IEEE Symposium on High Performance Interconnects, Aug. 2008.

Herlihy et al., "Hopscotch Hashing," *DISC '08 Proceedings of the 22nd International Symposium on Distributed Computing*, pp. 350-364 (Sep. 22, 2008).

"Hopscotch Hashing," *Wikipedia* entry downloaded from http://en.wikipedia.org/wiki/Hopscotch_hashing on Oct. 6, 2014 (3 pages).

Peng et al., "Content-Addressable memory (CAM) and its network applications," International IC—Taipei Conference Proceedings, May 2000.

Shavit, "Hopscotch Hashing," PowerPoint Presentation downloaded from http://www.velox-project.eu/sites/default/files/Hopscotch%20Hashing%20talk%20slides.ppt on Oct. 6, 2014 (50 slides).

U.S. Appl. No. 13/115,670, "Methods and Apparatus for Handling Multicast Packets in an Audio Video Bridging (AVB) Network," filed May 25, 2011 (Pannell et al.).

U.S. Appl. No. 13/737,608, "Exact Match Lookup in Network Switch Devices," filed Jan. 9, 2013 (Arad et al.).

U.S. Appl. No. 61/695,520, "Efficient TCAM Architecture," filed Aug. 31, 2012 (Levi et al.).

\* cited by examiner ial Patent App. No. 61/952,783, entitled "Resilient Hash-# RESILIENT HASH COMPUTATION FOR LOAD BALANCING IN NETWORK SWITCHES

CROSS REFERENCE TO RELATED APPLICATION

The present application claims the benefit of U.S. Provisional Patent App. No. 61/952,783, entitled "Resilient Hashing," filed on Mar. 13, 2014, which is hereby incorporated by reference in its entirety.

FIELD OF TECHNOLOGY

The present disclosure relates generally to communication systems and, more particularly, to using hash functions to select network interfaces in a group of network interfaces.

BACKGROUND

Today, hash functions are widely used in a variety of computing applications to map data in a larger set to a value in a smaller set. For example, a relatively long sequence of bits may be supplied as an input into a mathematical function to generate a shorter sequence of bits that serves as an index into a database table.

One area of application in which hashing can be particularly useful is network switching. In general, a network switch may receive and transmit data packets via multiple ports. In some situations, there may be more than one possible network link via which a packet can be transmitted to properly forward the data packet to its destination. Moreover, network links sometimes are purposefully aggregated to provide more bandwidth between communicating devices or networks. Grouping links together to define wider communication channels is sometimes referred to as link aggregation (LAG). In those situations where multiple links present equally attractive routing choices to a network switch, the routing technique is typically referred to as equal-cost multi-path (ECMP) routing. A hash function is sometimes used to select one of the links in a LAG group to transmit a packet. For example, the hash function can be applied to a portion or portions of a header of the packet, and a result of the hash function indicates one of the links in the LAG group.

SUMMARY OF THE DISCLOSURE

In an embodiment, a network device comprises a packet processor device configured to determine that packets are to be transmitted to a destination via a group of network interfaces that are coupled to respective network links, and a load balancing network interface selector. The load balancing network interface selector is configured to select network interfaces in the group via which to egress packets from the network device using a first hash function, and in response to determining that a first network interface within the group has become inoperable, continue to use the first hash function to select network interfaces in the group via which to egress packets from the network device. The load balancing network interface selector is further configured to, in response to determining that the first network interface within the group has become inoperable, when the first network interface is selected for packets using the first hash function, reselect network interfaces in the group via which to egress the packets from the network device using a second hash function that is different from the first hash function.

In another embodiment, a method in a network device includes determining, at the network device, that packets are to be transmitted to a destination via a group of network interfaces of the network device, wherein network interfaces among the group of network interfaces are coupled to respective network links. The method also includes, for data units that are determined by the network device to be transmitted via the group of network interfaces, using a first hash function, at the network device, to determine via which network interfaces in the group the packets are to be egressed, and egressing packets from the network interfaces determined using the first hash function. Additionally, the method includes, when it is determined that a first network interface in the group has become inoperable, continuing to use the first hash function to determine via which network interfaces in the group further packets are to be egressed. The method further includes when it is determined that the first network interface in the group has become inoperable, and when the use of the first hash function selects the first network interface for a subset of the further data units, using a second hash function, at the network device, to determine via which network interfaces in the group the subset of further packets are to be egressed, wherein the second hash function is different from the first hash function. The method also includes egressing further packets via the network interfaces determined using the first hash function and the second hash function.

DETAILED DESCRIPTION

Figure 1:
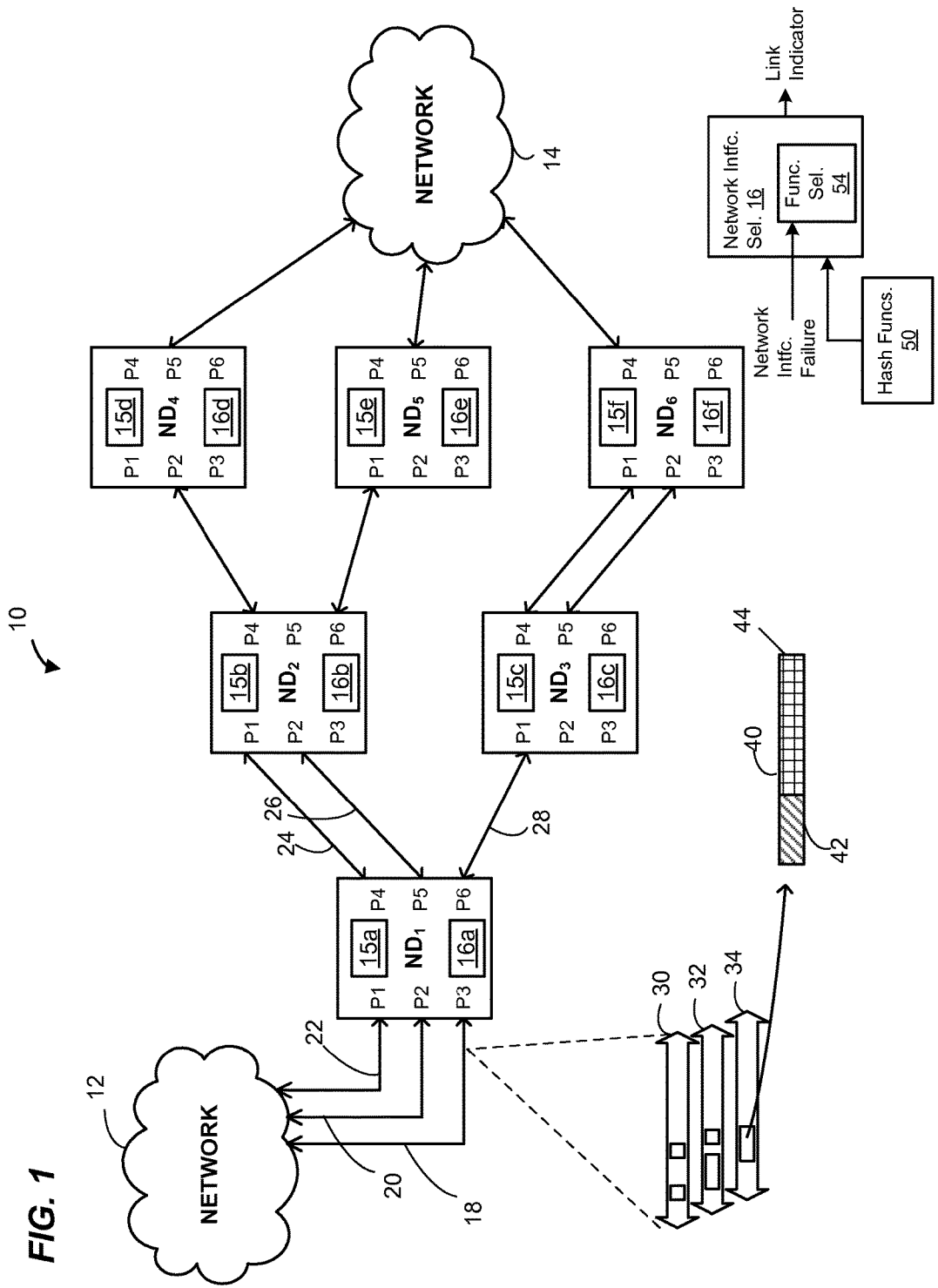
FIG. 1 is a block diagram of a communication network in which network devices apply hash computation techniques discussed herein, according to an embodiment.

FIG. 1 is a block diagram of an example communication network 10 in which several network devices $ND_1$, $ND_2, \ldots, ND_6$ process data flows between an external network 12 and an internal network 14, according to an embodiment. In some embodiments, the network 10 utilizes load-balancing across multiple network paths. The network devices $ND_1$-$ND_6$ may be of the same or different types of network devices, and include workgroup switches, other types of switches, routers, or any other suitable network devices having data processing capability, in various embodiments.

Each of the network devices $ND_1$-$ND_6$ includes a respective packet processor 15a-15f that is configured to determine via which network interfaces of the network device packets are to be egressed. In some embodiments, each network device includes a different implementation of the packet processor 15, or a subset of the devices $ND_1$-$ND_6$ includes a packet processor 15 of the same structure.

Each of the network devices $ND_1$-$ND_6$ includes a respective network interface selector 16a-16f that implements network interface selection techniques discussed below, in an embodiment. In some embodiments, only one of the network devices (e.g., network device $ND_1$) includes a network interface selector 16, or only some of the devices $ND_1$-$ND_6$ include a respective network interface selector 16.

In operation, the network device $ND_1$ receives data units (such as packets or frames (hereinafter referred to as "packets" merely for ease of explanation and brevity)) traveling from the external network 12 to the internal communication network 14 via communication links 18, 20, and 22 at respective ports P1, P2, and P3 (generally referred to herein as "ingress ports" or "source ports" $P_R$). The packet processor 15a determines (e.g., by analyzing headers in the packets) that certain packets are to be egressed by a group of ports P4, P5, and P6. Thus, the network device $ND_1$ forwards the certain packets to the network devices $ND_2$ or $ND_3$ via the corresponding ports P4, P5, and P6 (generally referred to herein as "egress ports" or "target ports" $P_T$) and, ultimately, respective communication links 24, 26, and 28. The ports P1-P6 are examples of network interfaces, according to some embodiments.

The routing configuration of the load-balancing network 10, in some scenarios, is such that the network device $ND_1$ selects one of the ports of P4, P5, or P6 to properly direct a data packet toward its destination in the internal network 14. In order to increase bandwidth to the destination, the communication links 24, 26, and 28 are treated as a single logical link, and the network device $ND_1$ applies load-balancing techniques to distribute the received packets among the appropriate ones of the links 24, 26, and 28, according to some embodiments. For example, the network device $ND_1$ selects ones of the ports P4, P5, P6 corresponding to ones of the links 24, 26, and 28. To this end, the network device $ND_1$ utilizes the network interface selector 16a to select one of the ports P4, P5, P6, in an embodiment. For example, in an embodiment, the network interface selector 16a uses a hash function to generate a hash value, and uses the hash value to select one of the ports P4, P5, P6 via which a packet is to be egressed, in an embodiment. In some embodiments, one or more of the network interface selectors 16 also utilize load-balancing techniques such as described in U.S. Pat. No. 8,756,424 to distribute transmission of packets across multiple network paths. In other embodiments, one or more of the network interface selectors 16 utilize other suitable load-balancing techniques to distribute transmission of packets across multiple network paths.

Although FIG. 1 illustrates a particular embodiment of the network devices $ND_1$-$ND_6$, each of these the network devices $ND_1$-$ND_6$ includes any suitable number of ports, and at least some of the network devices $ND_1$-$ND_6$ have different numbers of ports. In some embodiments, configurations, and/or scenarios, some or all of the network devices $ND_1$-$ND_6$ perform protocol translation for some of the packets by removing and/or adding protocol headers at one or several protocol layers of a corresponding communication protocol stack.

The links 18, 20, 22 correspond to different physical communication channels such as network cables, wireless bands, etc., or logical channels such as timeslots of a digital signal 1 (DS1) line, to take one example, in various embodiments. Similarly, ports P1, P2, P3 correspond to physical or logical resources of the network device $ND_1$, in various embodiments.

As illustrated in FIG. 1, the link 18 carries one or more data flows 30, 32, 34. Typically but not necessarily, each of the data flows 30, 32, 34 is a bidirectional flow including data traveling from the network 12 to the network 14, or inbound data, and data traveling to the network 12 from the network 14, or outbound data. The links 20 and 22 also carry one or several data flows, in an embodiment. Some of the data flows 30, 32, 34 are associated with more than one of the links 18-22, in an embodiment.

In some embodiments and/or scenarios, the data flows 30, 32, 34 are associated with different communication protocols such as Transmission Control Protocol (TCP) layered over Internet Protocol (IP) (hereinafter, "TCP/IP"), User Datagram Protocol (UDP) layered over IP (hereinafter, "UDP/IP"), File Transfer Protocol (FTP), Hypertext Transfer Protocol (HTTP), etc. For example, the data flow 30 corresponds to FTP, the data flow 32 corresponds to Telnet, and the data flow 34 corresponds to HTTP, in one scenario. Further, some of the data flows 30-34 correspond to different sessions associated with the same communication protocol, in some scenarios. A typical network link also includes Simple Mail Transfer Protocol (SMTP), Structured Query Language (SQL), and several additional data flows associated with e-mailing, web browsing, database applications, remote login, and other application types.

In some scenarios, each of the data flows 30, 32, 34 includes multiple streams, sessions, or connections corresponding to various communication protocol layers. It is noted that some protocols, such as TCP, are connection-oriented while others, such as UDP, are connectionless. In one example scenario, an outside host on the network 12 connects to a local host on the network 14 by establishing a TCP connection having a particular address and port combination on both ends. This connection is identifiable by the TCP header specifying, in part, the address of the outside host, the address of the local host, the port on the outside host, and the port on the local host. An individual TCP/IP packet carries a certain quantum or chunk of information associated with the same connection, or communication session. On the other hand, in another example scenario, a pair of hosts uses the UDP protocol to exchange individual messages, or datagrams, without establishing a connection. Thus, in some scenarios, each of the data flows 30, 32, 34 includes one or more streams such as TCP streams including multiple packets associated with a single data exchange or single packets conveying individual messages in their entirety. In the examples discussed below, a data stream generally refers to a unidirectional or bidirectional data exchange between two or more hosts including one or more data units such as data packets or frames.

With continued reference to FIG. 1, an example data packet 40 in the flow 34 includes a header 42 and a payload 44. In general, the header 42 corresponds to one or more layers of a protocol stack. The packet processor 15 is configured to analyze the header 42 to determine via which port or ports the packet 40 should be egressed. For example, in some embodiments, the packet processor 15 uses a portion of the header 42, such as a destination address, to look up in a forwarding database (not shown in FIG. 1) an indication of a port or ports via which the packet 40 is to be egressed. In some embodiments, the indication of the port or ports via which the packet 40 is to be egressed is an indication of a group of ports (e.g., a LAG group, an ECMP group, a trunk, etc.), and the network interface selector 16 selects one of ports within the group.

In some embodiments, when the packet processor 15a identifies a group of ports (e.g., the group P4, P5, P6) for a packet, the network interface selector 16a selects one of the ports P4, P5, P6 using a hash function, according to an embodiment. For example, the network interface selector 16a is configured to utilize a first hash function (among a plurality of available hash functions 50) to select appropriate ones of the ports P4, P5, P6 to egress packets destined for the network 14. If one of the ports P4, P5, P6 becomes inoperable (e.g., port P4), the network interface selector 16a is configured to continue utilizing the first hash function, and when the first hash function indicates operable ports (e.g., P5 and P6), to select those operable ports. However, when the first hash function indicates the inoperable port (e.g., P4) should be utilized to transmit a packet, the network interface selector 16a is configured to then utilize a second hash function (among the plurality of available hash functions 50) to determine which of the remaining operable ports (e.g., P5 or P6) should be utilized. A port is considered inoperable when, for example, the port itself or a corresponding network link coupled to the port cannot be used, in some embodiments. For example, in various embodiments, a port cannot be used if the port itself fails, a corresponding network link coupled to the port fails, etc. As discussed above, ports are examples of network interfaces. In other embodiments, a network interface corresponds to virtual port, or another suitable interface.

Thus, as discussed above, the network interface selector 16 is configured to use a first hash function to select, within a group of network interfaces, appropriate ones of the network interfaces via which packets are to be transmitted. The network interface selector 16 is configured to receive an indication of an inoperable network interface and, responsive to such an indication, to continue utilizing the first hash function when the first hash function indicates an operable network interface, but then use a second hash function when the first hash function indicates the inoperable network interface. In an embodiment, the network interface selector 16 includes a hash function selector 54 to select an appropriate one of the hash functions 50 as the second hash function.

Figure 2:
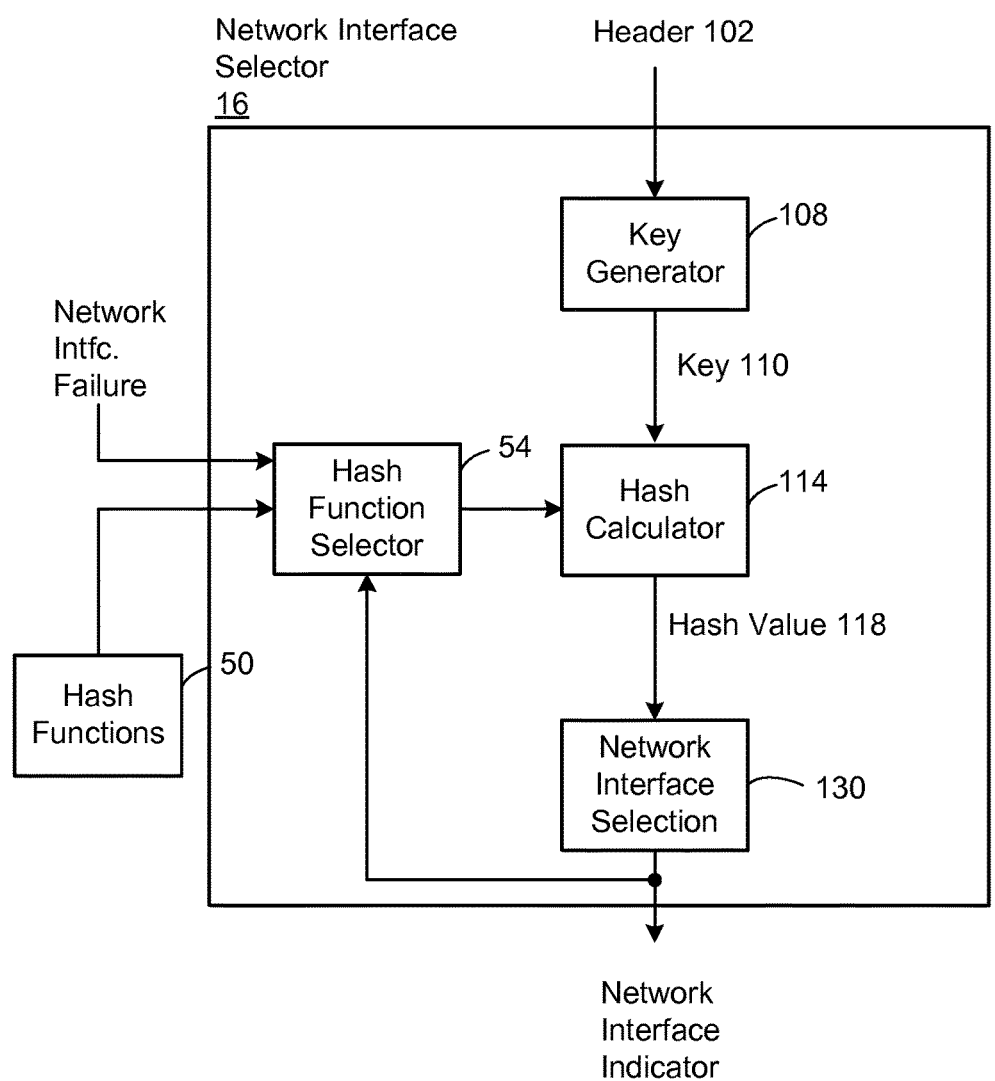
FIG. 2 is a block diagram of an example network interface selector which is implemented in one or more of the network devices of FIG. 1, according to an embodiment.

FIG. 2 is a more detailed block diagram of the example network interface selector 16 of FIG. 1, according to an embodiment. The network interface selector 16 is configured to receive at least a portion 102 of a header of a packet (for ease of explanation and brevity, the term "at least the portion 102 of the header" will be referred to as "the header 102"), according to an embodiment. A key generator 108 generates a key 110 based on the header 102. For example, in an embodiment, the key generator 108 is configured to generate the key based on one or more portions of the header 102, such as one or more of at least a portion of an address field, a virtual local area network (VLAN) identifier, etc., and/or one or more other suitable fields of the header 102.

A hash calculator 114 applies a selected hash function to the key 110 to generate a hash value 118. The hash function utilized by the hash calculator 114 is selected from the available hash functions 50 by the hash function selector 54. A network interface selection module 130 is configured to utilize the hash value 118 to select one network interface from a group of network interfaces. As merely an illustrative example, if the group of network interfaces consists of four members, each member is assigned a respective value of 0, 1, 2, or 3, and a modulo 4 operation is performed on the hash value 118 to generate a value of 0, 1, 2, or 3, according to an illustrative embodiment. The output of the modulo 4 operation thus indicates a particular one of the members. In another embodiment, the selected hash function is designed to generate a hash value 118 of 0, 1, 2, or 3, and thus the hash value 118 indicates a particular one of the members.

In an embodiment, the hash function selector 54 receives an indication of which, if any, members of a group of network interfaces is inoperable. Additionally, according to an embodiment, the hash function selector 54 receives the network interface indicator generated by the network interface selection module 130. The hash function selector 54 is configured to use the indication of which members of the group of network interfaces is inoperable to determine if the output of network interface selection module 130 selected an inoperable network interface, according to an embodiment. When the hash function selector 54 determines that the output of network interface selection module 130 selected an inoperable network interface, the hash function selector 54 is configured to select a second hash function and to cause the hash calculator 114 to generate a new hash value 118 using the second hash function, according to an embodiment. The network interface selection module 130 then utilizes the new hash value 118 to select another network interface from the group of network interfaces.

Figure 3:
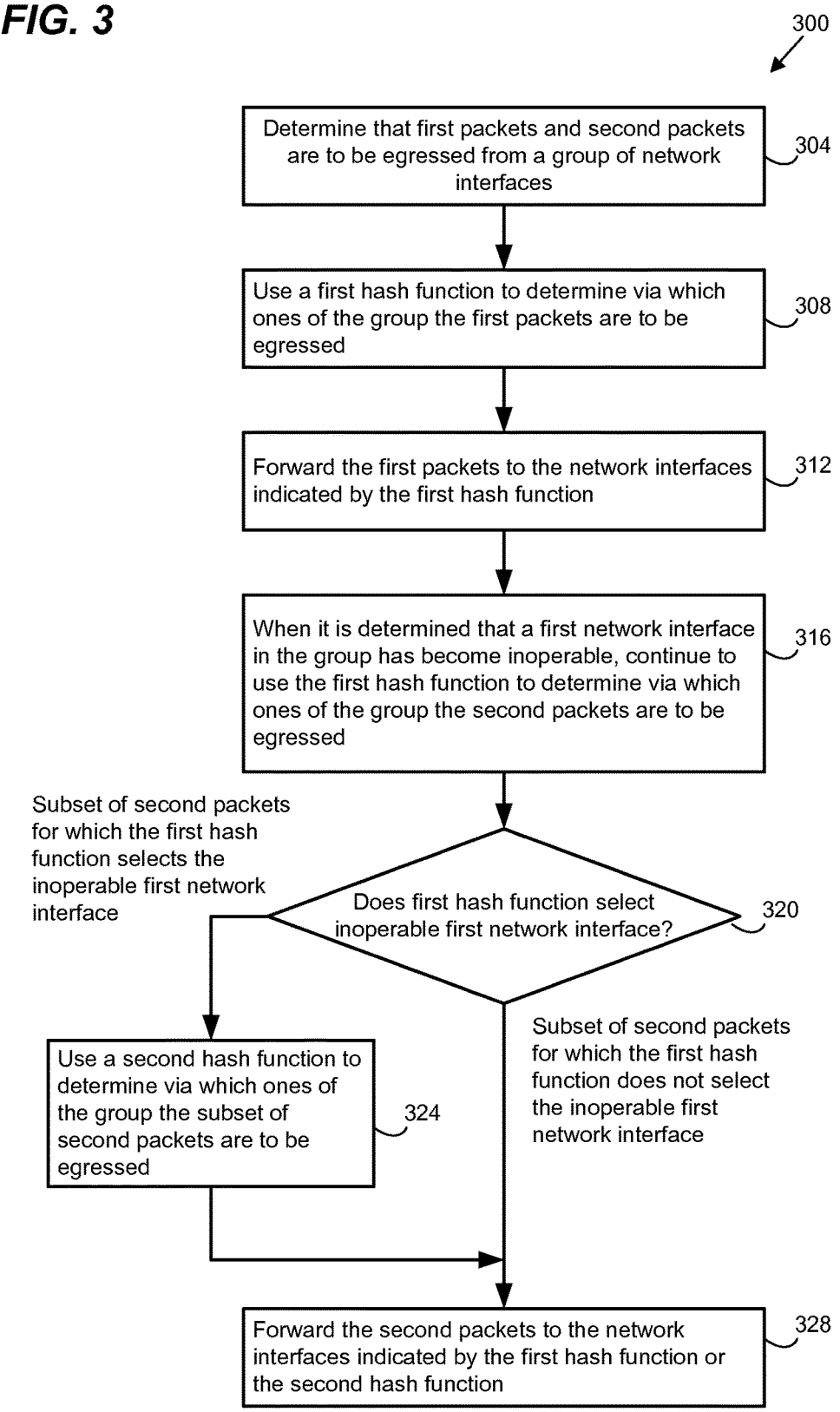
FIG. 3 is a flow diagram of an example method for processing packets in a network device that is implemented by one or more of the network devices of FIG. 1, according to an embodiment.

FIG. 3 is a flow diagram of an example method 300 for processing packets in a network device, according to an embodiment. The network device $ND_1$ of FIG. 1, including the network interface selector 16, is configured to implement the method 300, according to an embodiment, and the method 300 is discussed with reference to FIGS. 1 and 2 merely for explanatory purposes. In other embodiments, the method 300 is implemented by another suitable network device. Similarly, in other embodiments, the network device $ND_1$ of FIG. 1 is configured to implement a suitable method different than the method 300.

At block 304, the network device determines that first packets and second packets are to be egressed from the network device via a group of network interfaces. For example, the packet processor 15 is configured to utilize a forwarding database to determine via which network interfaces packets are to be egressed, as discussed above, according to some embodiments. In some scenarios, the forwarding database indicates the group of network interfaces for certain packets, e.g., the first packets and the second packets.

At block 308, the network device uses a first hash function to determine via which ones of the network interfaces in the group the first packets are to be egressed. For example, the network interface selector 16 is configured to implement block 308, in an embodiment. At block 312, the first packets are forwarded to the network interfaces indicated by the first hash function so that the first packets are egressed by the appropriate ones of the network interfaces in the group.

At block 316, when it is determined that a first network interface in the group has become inoperable, the network device continues to use the first hash function to determine via which ones of the network interfaces in the group second packets are to be egressed. For example, the network interface selector 16 is configured to implement block 316, in an embodiment.

At block 320, it is determined whether use of the first hash function selects the first network interface for any of the second packets. For example, the network interface selector 16 is configured to implement block 320, in an embodiment. For a subset of second packets that the first hash function selects the first network interface, the flow proceeds to block 324.

At block 324, the network device uses a second hash function to determine via which ones of the network interfaces in the group the subset of the second packets are to be egressed. For example, the network interface selector 16 is configured to implement block 324, in an embodiment.

From block 324, the flow proceeds to block 328. Additionally, at block 320, for second packets that use of the first hash function does not select the first network interface, the flow proceeds to block 328. At block 328, the second packets are forwarded to the network interfaces indicated by the first hash function or the second hash function so that the second packets are egressed by the appropriate ones of operable network interfaces in the group.

Figure 4:
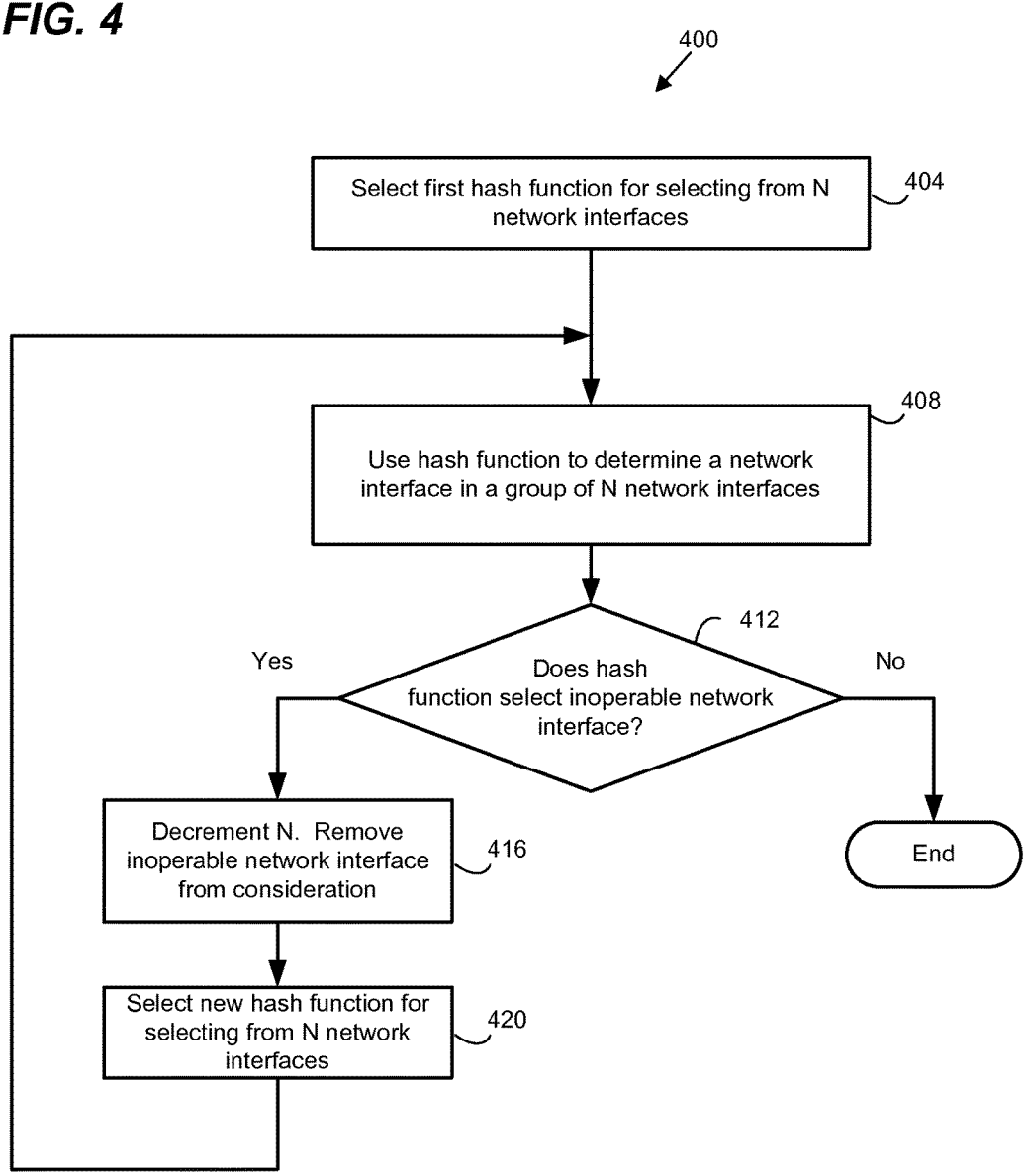
FIG. 4 is flow diagram of an example method for selecting a network interface within a group of network interfaces that is implemented by one or more of the network devices of FIG. 1 and/or by the example network interface selector of FIG. 2, according to an embodiment.

When multiple network interfaces become inoperable, techniques such as described with respect to FIG. 3 are generally repeated, according to some embodiments. For instance, FIG. 4 is a flow diagram of an example method 400 for selecting a network interface within a group of N network interfaces, where N is a positive integer greater than one, according to an embodiment. The method 400 is suitable for selecting network interfaces in a group and handling scenarios in which more than one network interface in the group becomes inoperable.

The network device $ND_1$ of FIG. 1, including the network interface selector 16, is configured to implement the method 400, according to an embodiment, and the method 400 is discussed with reference to FIGS. 1 and 2 merely for explanatory purposes. In other embodiments, the method 400 is implemented by another suitable network device. Similarly, in other embodiments, the network device $ND_1$ of FIG. 1 and/or the network interface selector 16 are configured to implement a suitable method different than the method 400.

At block 404, the network device selects a first hash function for selecting one network interface from the group of N network interfaces. For example, the hash function selector 54 is configured to select a first hash function, according to some embodiments. In an embodiment, N is a number corresponding to the group when it is assumed that all network interfaces in the group are operable.

At block 408, the network device uses the selected hash function to select one of the network interfaces in the group. For example, the network interface selector 16 is configured to implement block 408, in an embodiment.

At block 412, it is determined whether the network interface selected at block 408 is inoperable. For example, the hash function selector 54 is configured to implement block 412, in an embodiment. If it is determined at block 412 that the selected network interface is operable, the flow ends. On the other hand, if it is determined at block 412 that the selected network interface is inoperable, the flow proceeds to block 416.

At block 416, N is decremented. Additionally, the inoperable interface selected at block 408 is removed from consideration. At block 420, a new hash function is selected from the available hash functions 50. The selected hash function is configured for selecting from a pool of N choices, according to an embodiment. In an embodiment, the hash function selector 54 is configured to implement block 420.

After block 420, the flow returns to block 408, at which the new hash function is used to determine a network interface from the reduced group of network interfaces. Thus, the method repeats until an operable network interface is selected.

Figure 5:
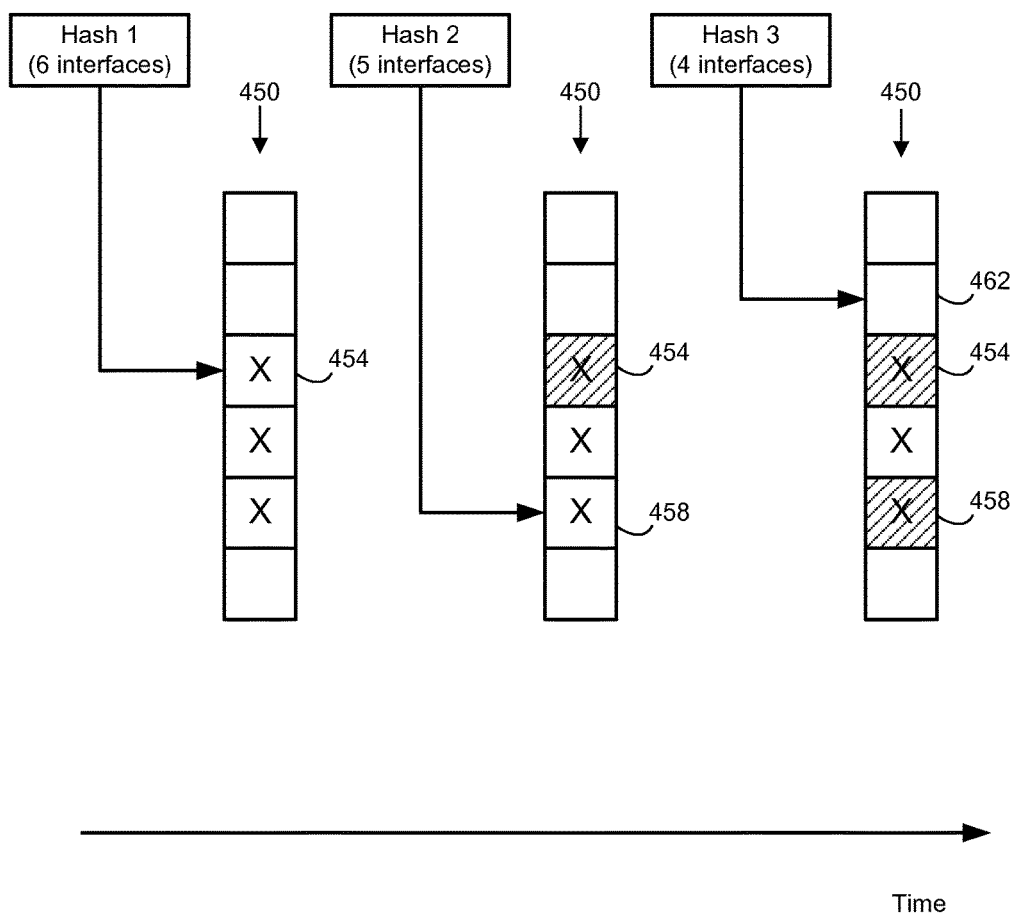
FIG. 5 is a diagram of an illustrative example of the method of FIG. 4 applied to a group of network interfaces, according to an embodiment.

FIG. 5 is a diagram of an illustrative example of the method 400 applied to a group 450 of network interfaces, according to an embodiment. The group 450 consists of N=6 network interfaces, and network interfaces that are inoperable are marked with an "X". Initially, a first hash (Hash 1) is utilized to select one of the 6 network interfaces in the group 450. A result of Hash 1 selects a network interface 454.

Because network interface 454 is inoperable, N is decremented to 5 and the network interface 454 is removed from consideration, which is indicated in FIG. 5 by cross-hatching. A second hash (Hash 2) is utilized to select one of the 5 remaining network interfaces. A result of Hash 2 selects a network interface 458.

Because network interface 458 is also inoperable, N is decremented to 4 and the network interface 458 is removed from consideration. A third hash (Hash 3) is utilized to select one of the 4 remaining network interfaces. A result of Hash 3 selects a network interface 462. Because network interface 462 is operable, the flow ends.

Figure 6:
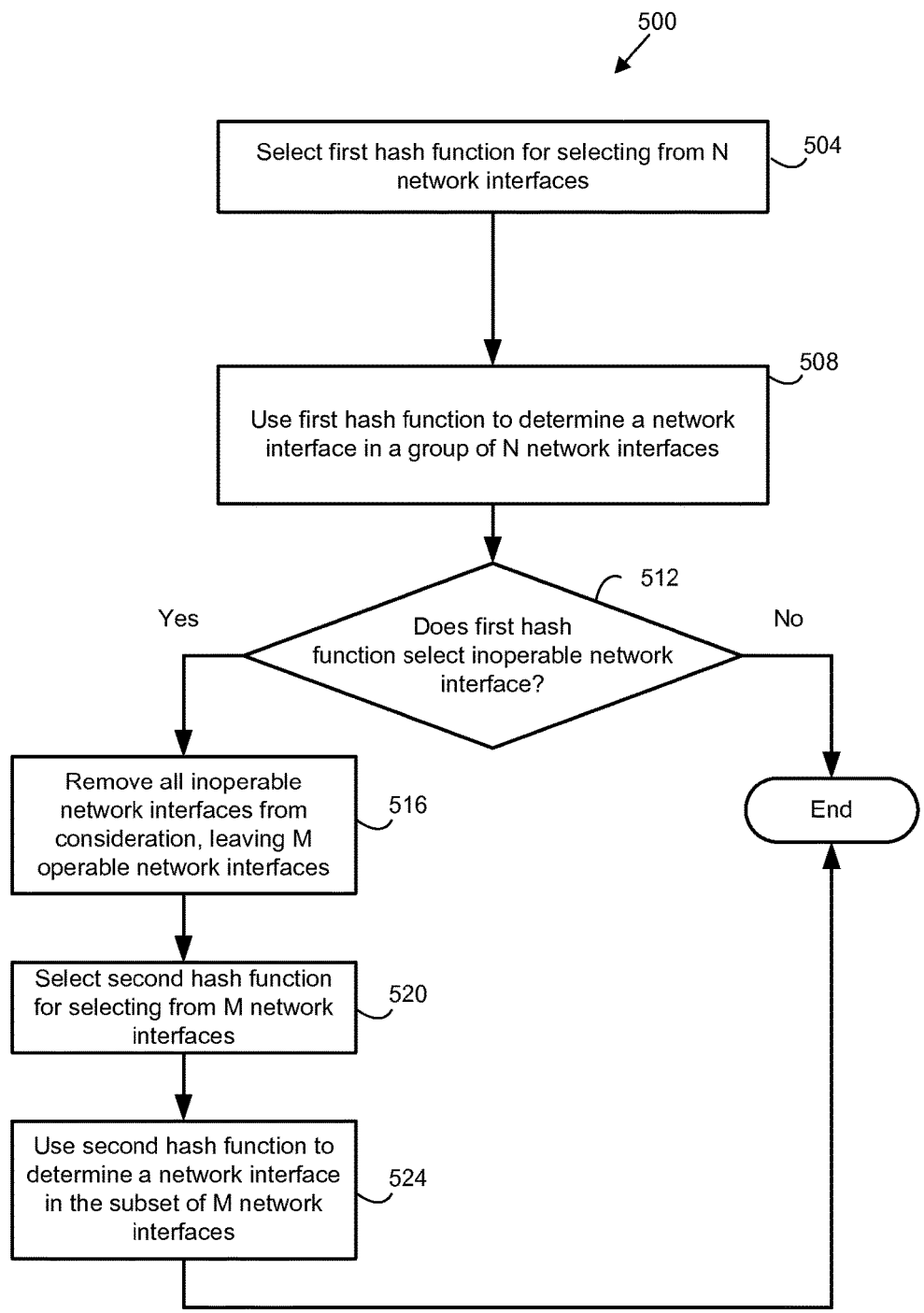
FIG. 6 is a flow diagram of another example method for selecting a network interface within a group of network interfaces that is implemented by one or more of the network devices of FIG. 1 and/or by the example network interface selector of FIG. 2, according to an embodiment.

FIG. 6 is a flow diagram of another example method 500 for selecting a network interface within a group of N network interfaces, where N is a positive integer greater than one, according to another embodiment. The network device $ND_1$ of FIG. 1, including the network interface selector 16, is configured to implement the method 500, according to an embodiment, and the method 500 is discussed with reference to FIGS. 1 and 2 merely for explanatory purposes. In other embodiments, the method 500 is implemented by another suitable network device. Similarly, in other embodiments, the network device $ND_1$ of FIG. 1 and/or the network interface selector 16 are configured to implement a suitable method different than the method 500.

At block 504, the network device selects a first hash function for selecting one network interface from the group of N network interfaces. For example, the hash function selector 54 is configured to select a first hash function, according to some embodiments. In an embodiment, N is a number corresponding to the group when it is assumed that all network interfaces in the group are operable.

At block 508, the network device uses the first hash function to select one of the network interfaces in the group. For example, the network interface selector 16 is configured to implement block 508, in an embodiment.

At block 512, it is determined whether the network interface selected at block 508 is inoperable. For example, the hash function selector 54 is configured to implement block 512, in an embodiment. If it is determined at block 512 that the selected network interface is operable, the flow ends. On the other hand, if it is determined at block 512 that the selected network interface is inoperable, the flow proceeds to block 516.

At block 516, all inoperable interface in the group are removed from consideration, leaving a subset of M operable interfaces, where M is a positive integer less than N. At block 520, a new second function is selected from the available hash functions 50. The second hash function is configured for selecting from a pool of M choices, according to an embodiment. In an embodiment, the hash function selector 54 is configured to implement block 520.

At block 524, the network device uses the second hash function to select one of the network interfaces in the subset of M network interfaces. For example, the network interface selector 16 is configured to implement block 524, in an embodiment.

Figure 7:
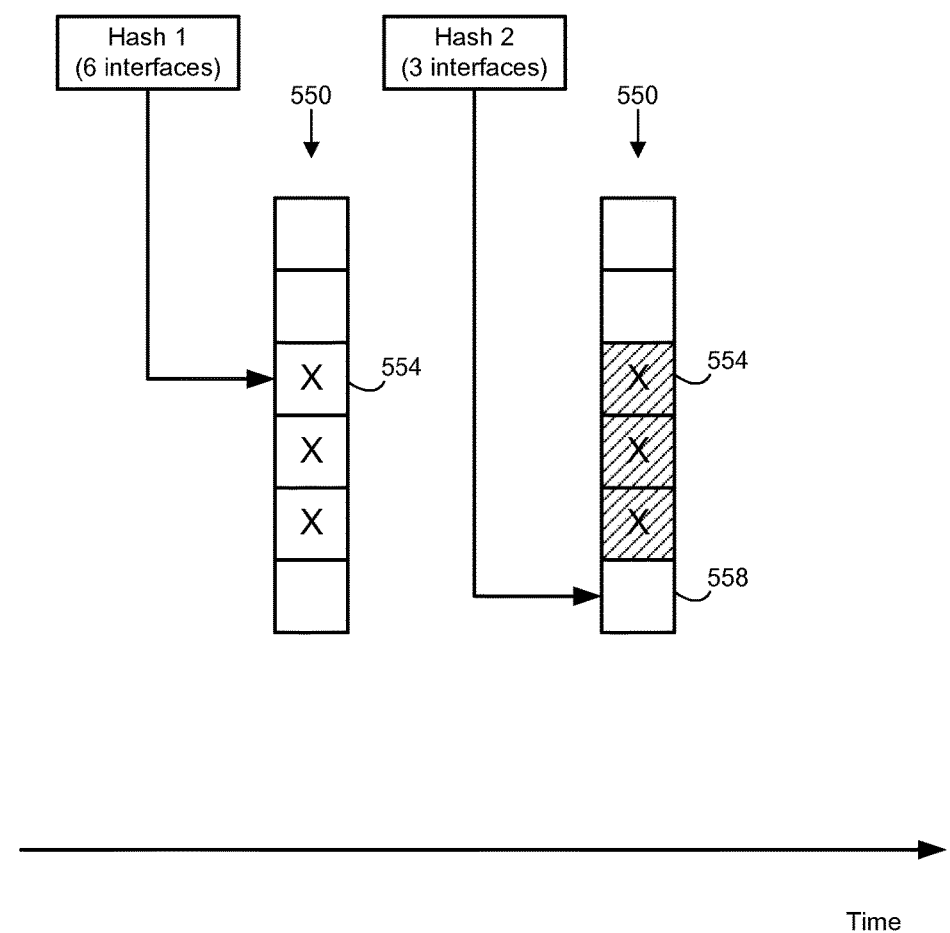
FIG. 7 is a diagram of an illustrative example of the method of FIG. 6 applied to a group of network interfaces, according to an embodiment.

FIG. 7 is a diagram of an illustrative example of the method 500 applied to a group 550 of network interfaces, according to an embodiment. The group 550 consists of N=6 network interfaces, and network interfaces that are inoperable are marked with an "X". Initially, a first hash (Hash 1) is utilized to select one of the 6 network interfaces in the group 550. A result of Hash 1 selects a network interface 554.

Because network interface 554 is determined to be inoperable, all inoperable network interfaces are removed from consideration, which is indicated in FIG. 7 by cross-hatching. Thus, a subset of M=3 network interfaces remain under consideration. A second hash (Hash 2) is utilized to select one of the 3 network interfaces remain under consideration. A result of Hash 2 selects a network interface 558, and the flow ends.

Figure 8:
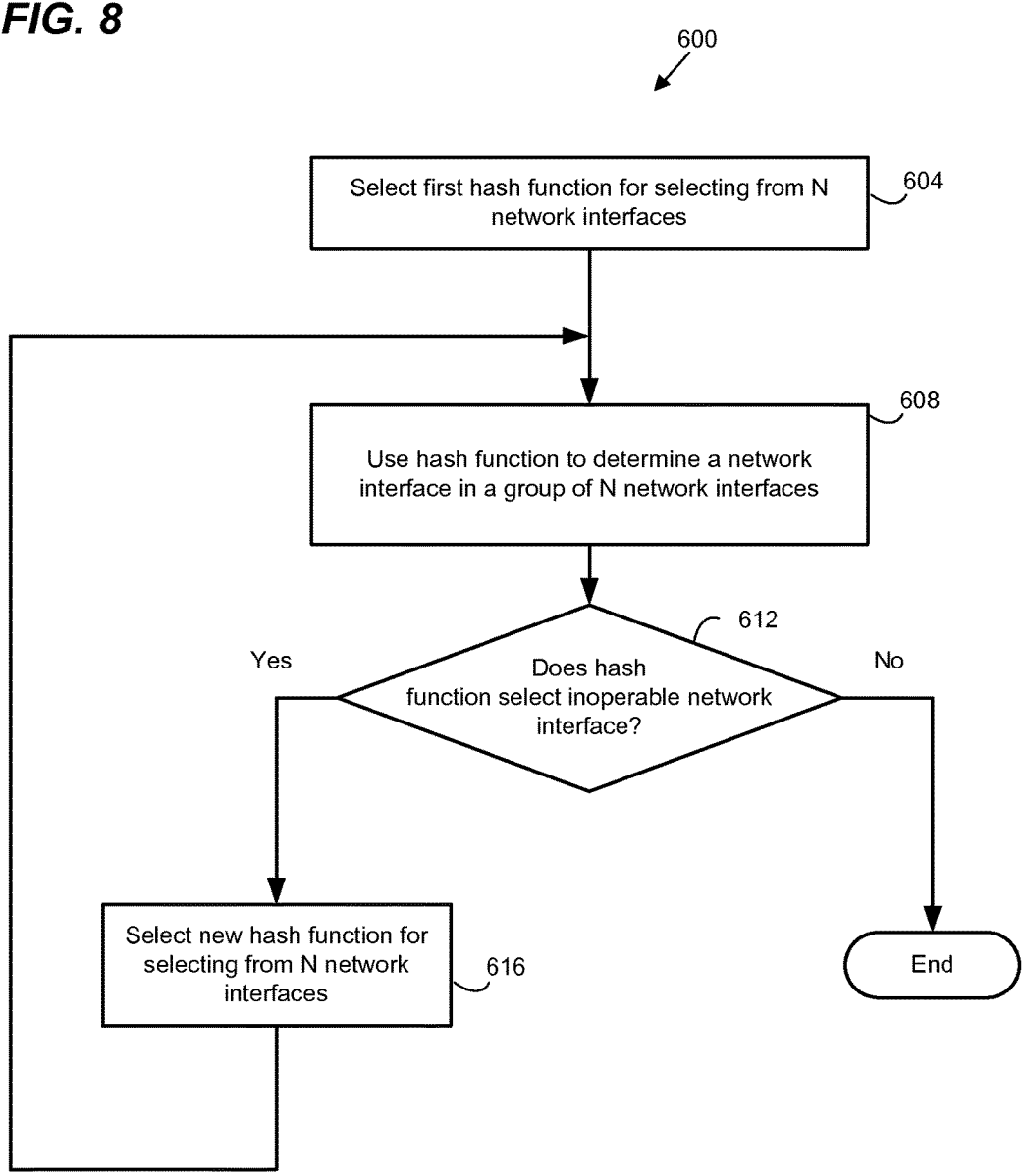
FIG. 8 is a flow diagram of yet another example method for selecting a network interface within a group of network interfaces that is implemented by one or more of the network devices of FIG. 1 and/or by the example network interface selector of FIG. 2, according to an embodiment.

FIG. 8 is a flow diagram of an example method 600 for selecting a network interface within a group of N network interfaces, where N is a positive integer greater than one, according to an embodiment. The network device $ND_1$ of FIG. 1, including the network interface selector 16, is configured to implement the method 600, according to an embodiment, and the method 600 is discussed with reference to FIGS. 1 and 2 merely for explanatory purposes. In other embodiments, the method 600 is implemented by another suitable network device. Similarly, in other embodiments, the network device $ND_1$ of FIG. 1 and/or the network interface selector 16 are configured to implement a suitable method different than the method 600.

At block 604, the network device selects a first hash function for selecting one network interface from the group of N network interfaces. For example, the hash function selector 54 is configured to select a first hash function, according to some embodiments. In an embodiment, N is a number corresponding to the group when it is assumed that all network interfaces in the group are operable.

At block 608, the network device uses the selected hash function to select one of the network interfaces in the group. For example, the network interface selector 16 is configured to implement block 608, in an embodiment.

At block 612, it is determined whether the network interface selected at block 608 is inoperable. For example, the hash function selector 54 is configured to implement block 612, in an embodiment. If it is determined at block 612 that the selected network interface is operable, the flow ends. On the other hand, if it is determined at block 612 that the selected network interface is inoperable, the flow proceeds to block 616.

At block 616, a new hash function is selected from the available hash functions 50. The selected hash function is configured for selecting from a pool of N choices, according to an embodiment. In an embodiment, the hash function selector 54 is configured to implement block 616.

After block 616, the flow returns to block 608, at which the new hash function is used to determine a network interface from the reduced group of network interfaces. Thus, the method repeats until an operable network interface is selected.

In some embodiments, the method 600 is not guaranteed to find an operable network interface. Thus, in some embodiments, a device implementing the method 600 is configured to end the method if an operable network interface has not been found after a suitable predetermined number of iterations. In some embodiments, if an operable network interface has not been found after a suitable predetermined number of iterations, another suitable method is utilized to select an operable network interface (e.g., blocks 516, 520, and 524 of the method 500 of FIG. 6).

Figure 9:
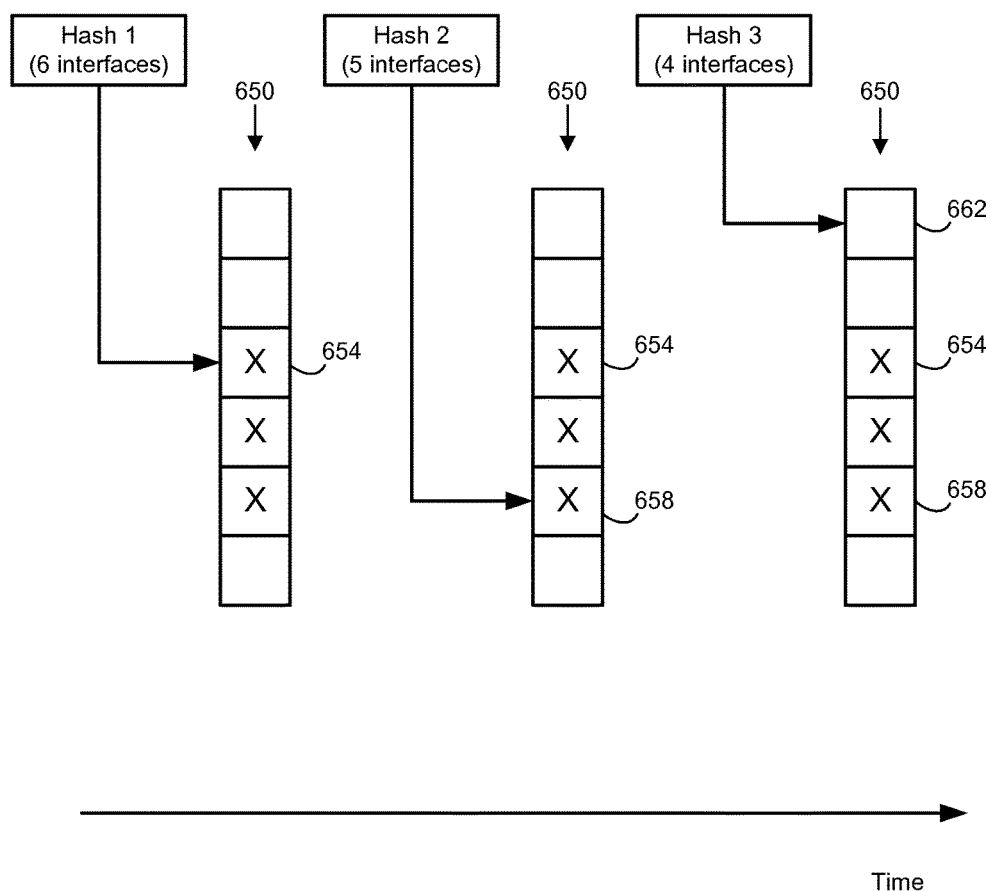
FIG. 9 is a diagram of an illustrative example of the method of FIG. 8 applied to a group of network interfaces, according to an embodiment.

FIG. 9 is a diagram of an illustrative example of the method 600 applied to a group 650 of network interfaces, according to an embodiment. The group 650 consists of N=6 network interfaces, and network interfaces that are inoperable are marked with an "X". Initially, a first hash (Hash 1) is utilized to select one of the 6 network interfaces in the group 650. A result of Hash 1 selects a network interface 654.

Because network interface 654 is inoperable, a second hash (Hash 2) is utilized to select one of the 6 network interfaces. A result of Hash 2 selects a network interface 658.

Because network interface 658 is also inoperable, a third hash (Hash 3) is utilized to select one of the 6 network interfaces. A result of Hash 3 selects a network interface 662. Because network interface 662 is operable, the flow ends.

At least some of the various blocks, operations, and techniques described above may be implemented utilizing hardware (e.g., one or more integrated circuit devices), a processor (e.g., implemented using one or more integrated circuit devices) executing firmware instructions, a processor (e.g., implemented using one or more integrated circuit devices) executing software instructions, or any combination thereof.

Although the forgoing text sets forth a detailed description of numerous different embodiments, it should be understood that the scope of the patent is defined by the words of the claims set forth at the end of this patent. The detailed description is to be construed merely as providing illustrative examples and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A network device, comprising:
   a packet processor device configured to determine that packets are to be transmitted to a destination via a group of N network interfaces that are coupled to respective network links, the group including multiple operable network interfaces and multiple inoperable interfaces; and
   a load balancing network interface selector comprising hardware configured to:
   select network interfaces in the group via which to egress packets from the network device using a first hash function configured to select from a group consisting of N members, and
   in response to determining that a first network interface within the group is inoperable,
   continue to use the first hash function to select network interfaces in the group via which to egress packets from the network device,
   determine a set of N−1 network interfaces in the group, wherein the set excludes the first network interface and includes i) one or more other network interfaces in the group that are operable, and ii) one or more other network interfaces in the group are inoperable, and when the first network interface is selected for packets using the first hash function, reselect network interfaces in the set of N−1 network interfaces via which to egress the packets from the network device using a second hash function that i) is different from the first hash function and ii) is configured to select from a group consisting of N−1 members.

2. The network device of claim 1, wherein the load balancing network interface selector is configured to:
determine whether a network interface selected using the first hash function is operable;
select the second hash function responsively to determining that the network interface selected using the first hash function is not operable; and
reselect a network interface in the set of N−1 network interfaces using the second hash function responsively to determining that the network interface selected using the first hash function is not operable.

3. The network device of claim 1, wherein the load balancing network interface selector is configured to:
when the first network interface is determined to have become inoperable, and when a second inoperable network interface is selected for packets using the second hash function,
determine a further set of N−2 network interfaces in the group, wherein the further set excludes the first network interface and the second network interface, and
reselect network interfaces in the further set via which to egress the packets from the network device using a third hash function that i) is different from the first hash function and the second hash function and ii) is configured to select from a group consisting of N−2 members.

4. The network device of claim 1, wherein the load balancing network interface selector is configured to:
when the first network interface is determined to have become inoperable, and when a second inoperable network interface is selected for packets using the second hash function,
reselect network interfaces in the group via which to egress the packets from the network device using a third hash function that i) is different from the first hash function and the second hash function and ii) is configured to select from a group consisting of N−2 members.

5. The network device of claim 1, wherein the network interfaces in the group comprise ports and/or virtual ports of the network device.

6. A method in a network device, the method comprising:
determining, at the network device, that packets are to be transmitted to a destination via a group of N network interfaces of the network device, the group including multiple operable network interfaces and multiple inoperable interfaces, wherein network interfaces among the group of network interfaces are coupled to respective network links;
for data units that are determined by the network device to be transmitted via the group of network interfaces, using a first hash function, at the network device, to determine via which network interfaces in the group the packets are to be egressed, the first hash function being configured to select from a group consisting of N members;
egressing packets from the network interfaces determined using the first hash function;
when it is determined that a first network interface in the group has become inoperable,
continuing to use the first hash function to determine via which network interfaces in the group further packets are to be egressed,
determining a set of N−1 network interfaces in the group, wherein the set excludes the first network interface and includes i) one or more other network interfaces in the group that are operable, and ii) one or more other network interfaces in the group that are inoperable, and
when the use of the first hash function selects the first network interface for a subset of the further data units, using a second hash function, at the network device, to determine via which network interfaces in the set of N−1 network interfaces the subset of further packets are to be egressed, wherein the second hash function is i) different from the first hash function and ii) is configured to select from a group consisting of N−1 members, and
egressing further packets via the network interfaces determined using the first hash function and the second hash function.

7. The method of claim 6, further comprising:
determining, at the network device, whether a network interface selected using the first hash function is operable;
selecting, at the network device, the second hash function responsively to determining that the network interface selected using the first hash function is not operable; and
reselecting, at the network device, a network interface in the set of N−1 network interfaces using the second hash function responsively to determining that the network interface selected using the first hash function is not operable.

8. The method of claim 6, further comprising:
when the first network interface is determined to have become inoperable, and when a second inoperable network interface is selected for packets using the second hash function,
reselecting, at the network device, network interfaces in the further set via which to egress the packets from the network device using a third hash function that i) is different from the first hash function and the second hash function and ii) is configured to select from a group consisting of N−2 members.

9. The method of claim 6, wherein egressing further packets via the network interfaces determined using the first hash function and the second hash function comprises egressing further packets via ports and/or virtual ports of the network device determined using the first hash function and the second hash function.

* * * * *